(12) United States Patent
Boyd et al.

(10) Patent No.: US 9,244,848 B2
(45) Date of Patent: Jan. 26, 2016

(54) HOST CONTROLLED HYBRID STORAGE DEVICE

(75) Inventors: James A. Boyd, Hillsboro, OR (US); Dale J. Juenemann, North Plains, OR (US); Francis R. Corrado, Newton, MA (US)

(73) Assignee: Intel Corporation, Santa Clara, CA (US)

( * ) Notice: Subject to any disclaimer, the term of this patent is extended or adjusted under 35 U.S.C. 154(b) by 262 days.

(21) Appl. No.: 13/993,170

(22) PCT Filed: Oct. 10, 2011

(86) PCT No.: PCT/US2011/055622
§ 371 (c)(1),
(2), (4) Date: Jun. 11, 2013

(87) PCT Pub. No.: WO2013/055312
PCT Pub. Date: Apr. 18, 2013

(65) Prior Publication Data
US 2013/0268731 A1    Oct. 10, 2013

(51) Int. Cl.
*G06F 12/08* (2006.01)

(52) U.S. Cl.
CPC ...... *G06F 12/0868* (2013.01); *G06F 2212/217* (2013.01); *G06F 2212/222* (2013.01)

(58) Field of Classification Search
None
See application file for complete search history.

(56) References Cited

U.S. PATENT DOCUMENTS

| 7,308,531 | B2 | 12/2007 | Coulson | |
| 7,472,219 | B2 | 12/2008 | Tamura | |
| 2002/0194440 | A1* | 12/2002 | Ghosh et al. | 711/156 |
| 2007/0186039 | A1 | 8/2007 | Nam | |
| 2011/0145489 | A1 | 6/2011 | Yu | |
| 2013/0179624 | A1* | 7/2013 | Lambert et al. | 711/103 |
| 2014/0215137 | A1* | 7/2014 | Bondurant et al. | 711/103 |

OTHER PUBLICATIONS

PCT International Search Report and Written Opinion issued in corresponding PCT/US2011/055622 dated May 24, 2012 (14 pages).

* cited by examiner

*Primary Examiner* — Gary Portka
(74) *Attorney, Agent, or Firm* — Trop, Pruner & Hu, P.C.

(57) ABSTRACT

A host based caching technique may be used to determine caching policies for a hybrid hard disk drive. Because the host based caching may make use of knowledge about what data is being cached, improved performance may be achieved in some cases.

29 Claims, 5 Drawing Sheets

HOST CONTROLLED HYBRID STORAGE DEVICE

BACKGROUND

This relates generally to controlling storage devices for processor-based systems.

Some storage devices have relatively fast access times and lower storage capacities, while other storage devices have slower access time and higher storage capacities. Since sometimes fast access is needed and other times large storage capacity is needed, it is advantageous to have one storage device that has both capabilities. Hybrid hard disks combine a small portion of solid state media and less expensive magnetic based media in one integrated unit. However, the performance of these devices may be limited. It would be advantageous to provide combined storage devices that have better performance.

DETAILED DESCRIPTION

The performance of hybrid hard disks may be limited to the effectiveness of logical block address only based caching because the device only has knowledge of the logical block addresses and no additional information, such as priority of the request or file system information. However, host software based non-volatile storage input/output caching techniques have knowledge of input/output priority, file types, process information, and other data to determine caching policies, and use this enhanced information together with discrete hard disk and solid state cache devices.

For current designs, with different types of memory in the same package, there is no method for passing enhanced information to the solid state cache media. Instead, only the host system software or drivers has access to this "extra data". In some embodiments, the host software drivers may use this richer information to control the various media types of a hybrid storage device. A hybrid storage device may include NAND flash memory, a future high speed non-volatile memory type, and/or a magnetic memory, to mention a few examples. In some cases, power savings and/or performance advantages may be achieved.

Figure 1:
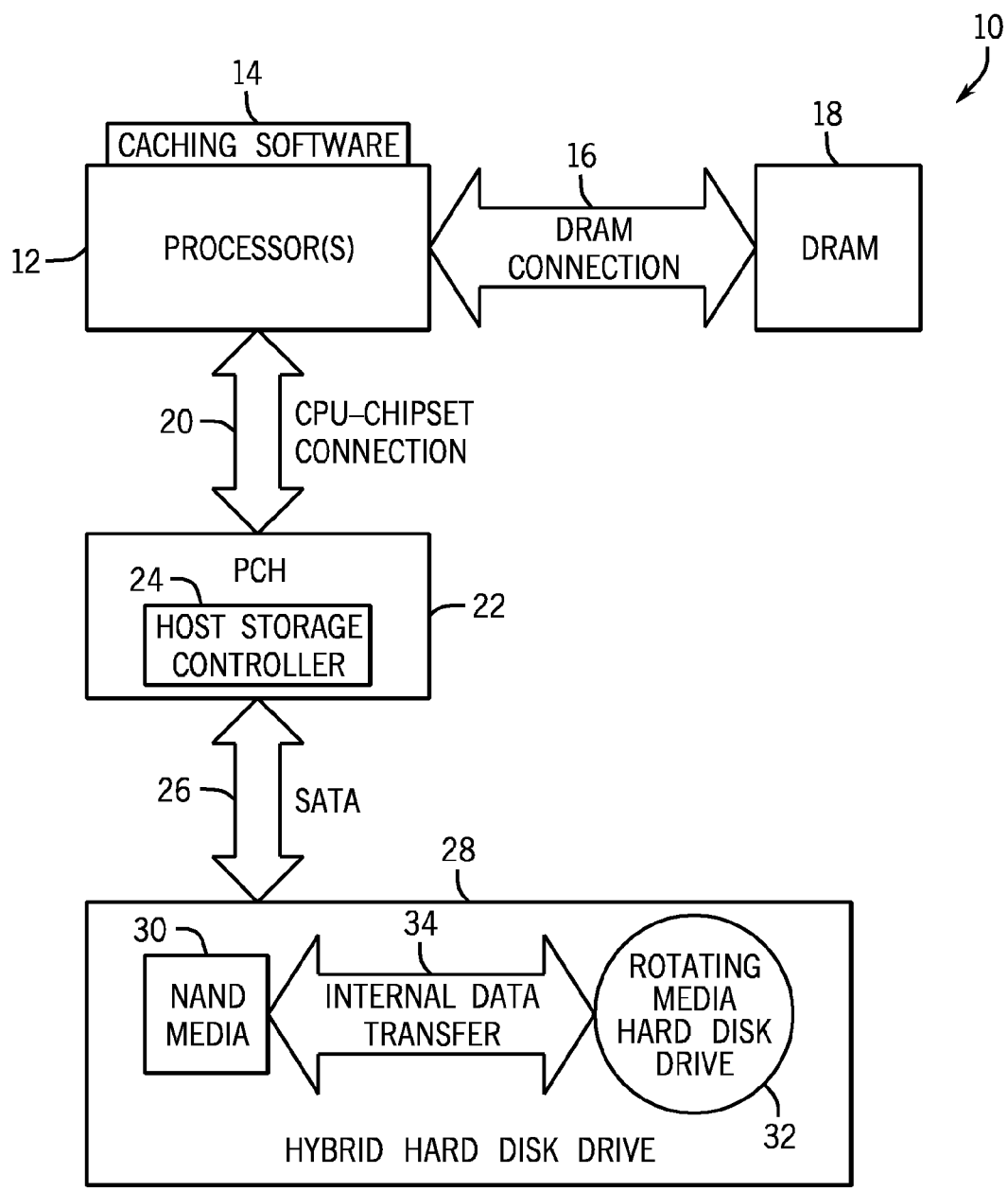
FIG. 1 is a schematic depiction of one embodiment of the present invention.

Referring to FIG. 1, in accordance with one embodiment, a host system 10 may include one or more processors 12 coupled over a suitable connection 16 to a system memory 18, including dynamic random access memory (DRAM). Caching software 14 may be executed by the processors 12. The processors 12, in one embodiment, may be coupled by a connection 20 to a chipset, including a peripheral component hub (PCH) 22. The peripheral component hub 22 may include a host storage controller 24. The architecture shown in FIG. 1 is only one example of a system architecture.

The host storage controller 24 may be coupled by a bus, such as a Serial Advanced Technology Attachment (SATA) bus 26 to a hybrid hard disk drive 28. The hybrid hard disk drive may be one package that includes a phase change memory and/or a NAND flash media 30, coupled over an internal data transfer bus 34 to a rotating media hard disk drive 32. Other combinations of semiconductor and magnetic memory may also be used.

In some embodiments, the drive 28 may be a processor or controller based system capable of executing instructions.

The hybrid hard disk drive is plugged into the host chipset over an interface, such as SATA, that may be controlled, in one embodiment by Intel's Smart Response Technology software, acting as the caching software 14. The software 14 uses host based caching mechanisms to direct system input/output to various physical media regions on the hybrid hard disk drive 28.

Most frequently used data may be directed and stored on the fastest media portion of the hybrid hard disk drive, which acts as a cache for the slower storage. If one of the storages becomes filled, the software 14 instructs the hybrid hard disk drive to move data from one region to another, via internal instructions, in order to avoid host memory movement, in some embodiments. The host software 14 can provide a better caching solution than a hard disk drive that does not have real time host knowledge and the richness of information needed to effectively control the two types of media within the storage device.

Particularly, relying on logical block addressing only based information and making cache insertion and eviction decisions based upon this limited data and simple algorithms, such as least recently used algorithms, can result in cache thrashing. In cache thrashing, lower priority data evicts higher priority data and/or reduced performance may result. By providing more information, this type of thrashing or performance hit can be lessened.

In another embodiment, physically separate devices, such as the devices 30 and 32, may be used. When the two devices are physically separate, the host software has the ability to directly control the content of cache with advanced algorithms, making use of rich information. However, two physically separate devices may take on additional complexity of handling the physical separation and necessary data synchronization.

By providing information about file types and process priority, the host can make decisions based on which logical addresses are touched. This more informed decision can lead to increased performance in some embodiments.

Allowing the host to control the mechanisms that place data either in the faster solid state media area or the magnetic slower media area of a hybrid storage device may lead to better performance and lower power consumption in some cases. This is because the host may be aware of the additional information associated with inputs/outputs destined for the device and can make more intelligent caching decisions as a result. Thus, the host can control the placement of incoming input and output data within the storage.

In some embodiments, the hybrid hard disk drive 28 directly exposes the total media size and region information to the host for all media types. Then the host can directly access the multimedia type areas on the disk via standard command sets. Each media type area is a continuous logical address subset of the total logical address range exposed to the host in one embodiment.

Alternately, in some embodiments, the host may issue negative logical block addresses of the magnetic or slower media area as an explicit indication that the request is to be cached in the fast solid state media area. The incoming logical block address from the host request is sign inverted and sent to the device 28. As another example, a separate indicator in the command may denote a cache this request or a do not cache this request. The negative logical block address region in the fast media may have a one-to-one relationship with the slower media backing storage region. In this way, the faster media region can serve as a write-back cache for the slower media.

The drive 28 may also accept a command that moves data between the various media types within the drive itself, thereby saving data movement to and from the host. In some embodiments, a mechanism to flush all data from one media type area to the magnetic or slower media type area can be provided. This mechanism may be manually invoked by software, but may also be invoked by the device automatically during initialization when connected to a system that does not have the caching software 14. In this way, the storage device presents the latest copy of data to the system, whether or not the caching software is present. An initiation command received from the host during initial device enumeration indicates the host intends to explicitly manage the media area types and prevents the global flush from occurring. The device may be configured to automatically flush if this initiation command is not received from the host within a certain period of time upon power-up. As another example, automatic flush may occur if the first command after power up is something other than the initiation command.

Figure 2:
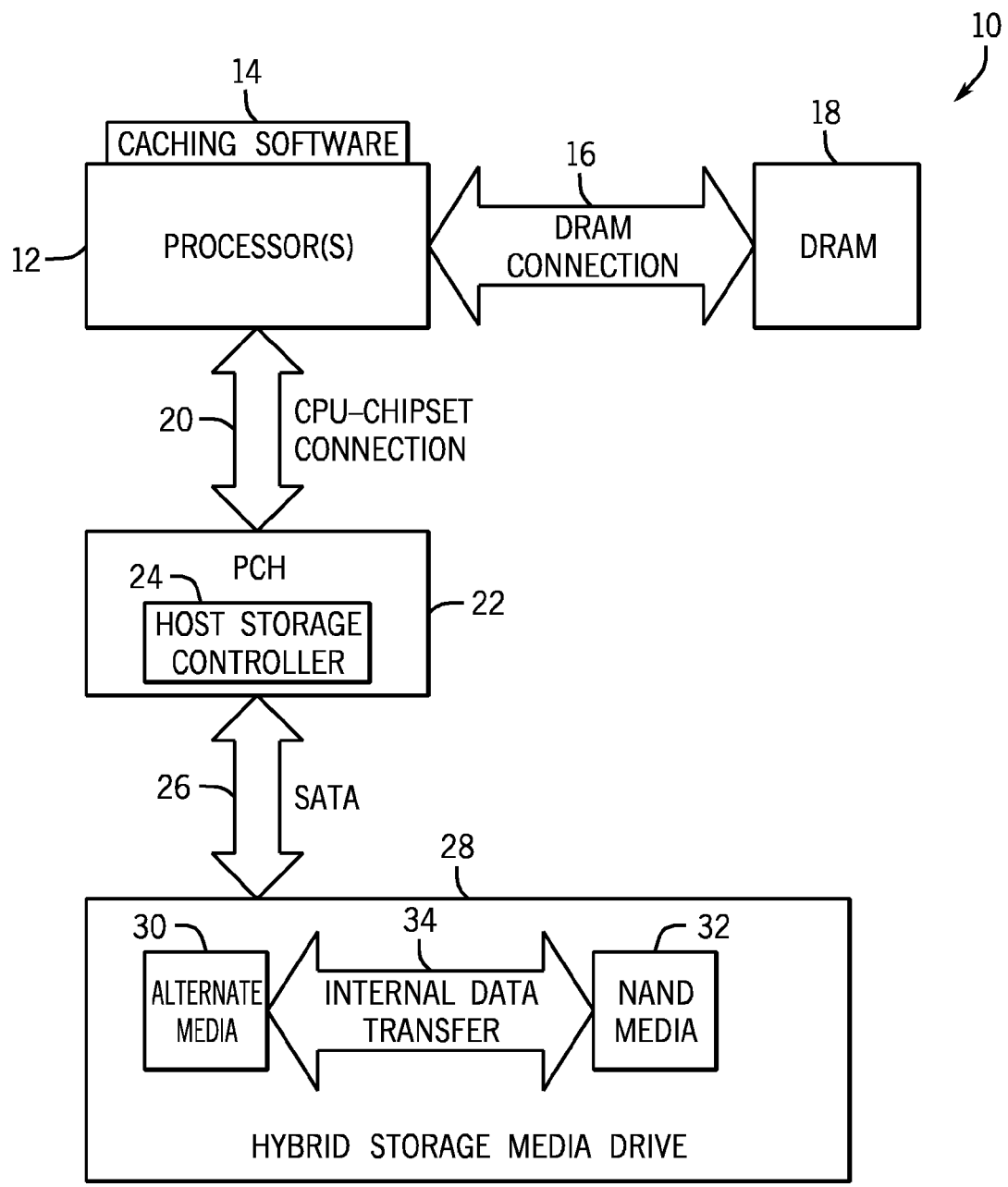
FIG. 2 is a schematic depiction of another embodiment of the present invention.

Another embodiment, shown in FIG. 2, differs in that the hybrid storage device 28 includes only solid state media, such as a future high speed non-volatile memory type 30 and NAND media 32.

Figure 3:
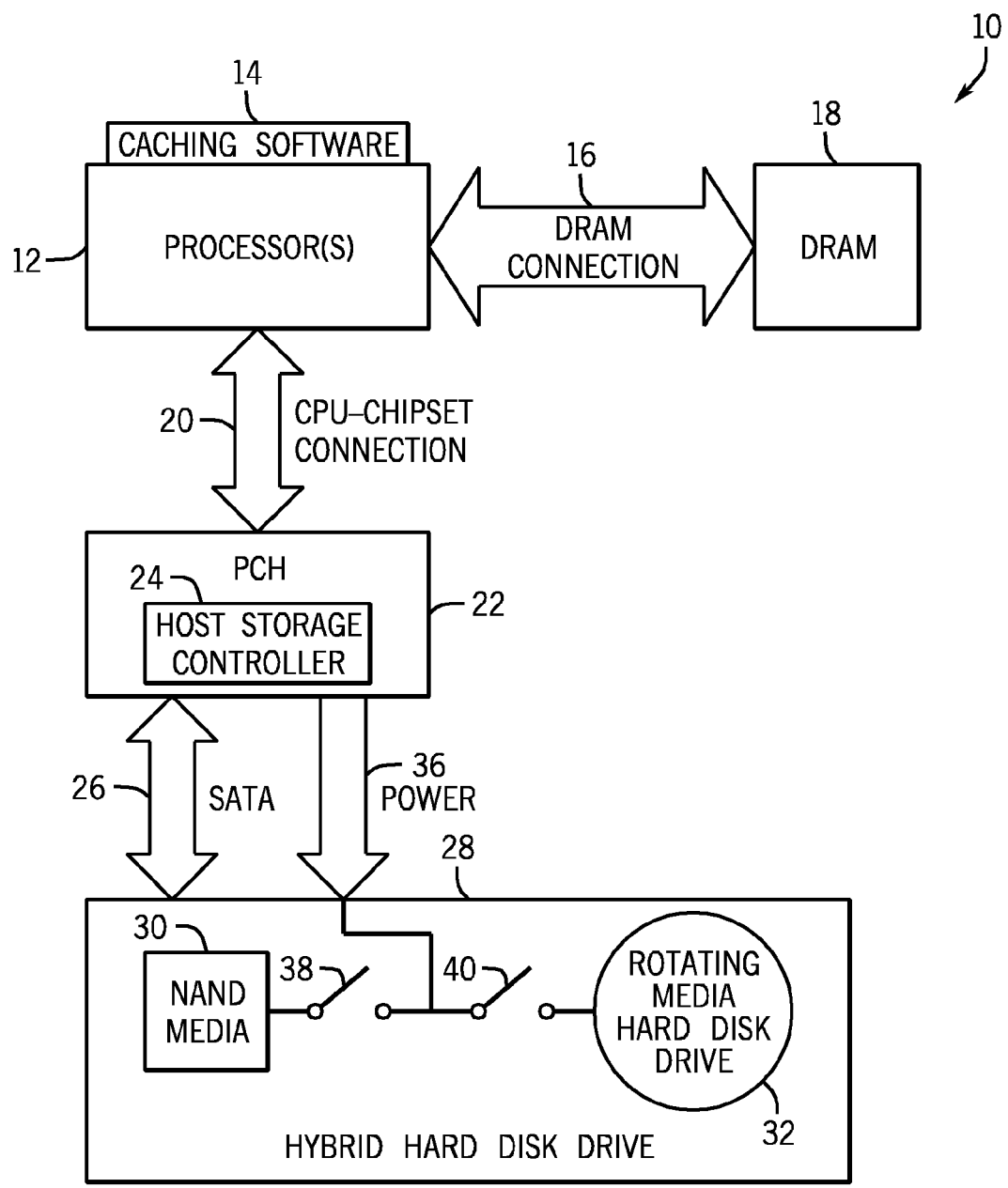
FIG. 3 is a schematic depiction of another embodiment of the present invention.

The embodiment of FIG. 3 differs in that a separate power line 36 is provided to the hybrid hard disk drive 28. In addition, the hybrid hard disk drive 28 has switches 38 and 40 for cutting power to the media 30 and/or the media 32.

Figure 4:
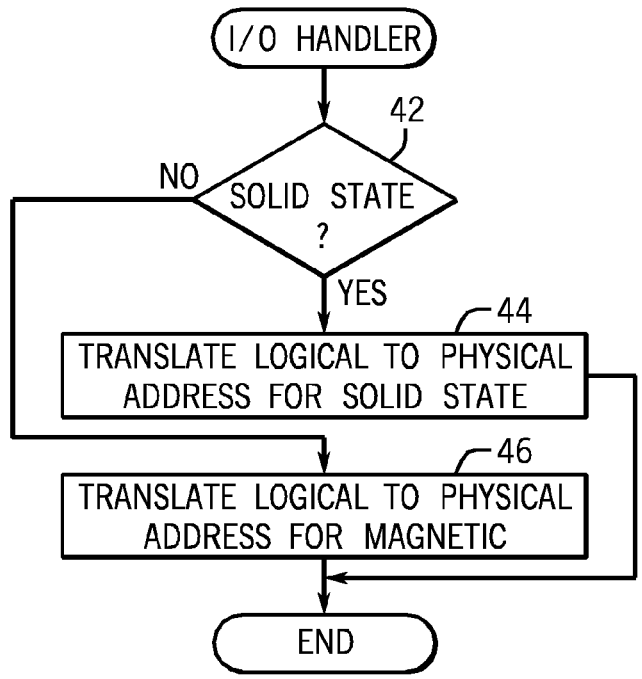
FIG. 4 is a flow chart for one embodiment of the present invention.

Referring to FIG. 4, the input/output handler may be implemented in software, hardware, and/or firmware. In software and firmware embodiments, the sequence may be implemented by computer executed instructions stored in a non-transitory computer readable medium, such as a semiconductor, magnetic, or optical storage. For example, the sequence of FIG. 4 could be stored as part of the caching software 14 in the system memory 18, in one embodiment.

Initially, a check at diamond 42 determines whether an access is to the solid state region. If so, the logical to physical addresses are translated for the solid state device, as indicated in block 44. Otherwise, the logical to physical addresses are translated for the magnetic or second storage device, as indicated in block 46.

Figure 5:
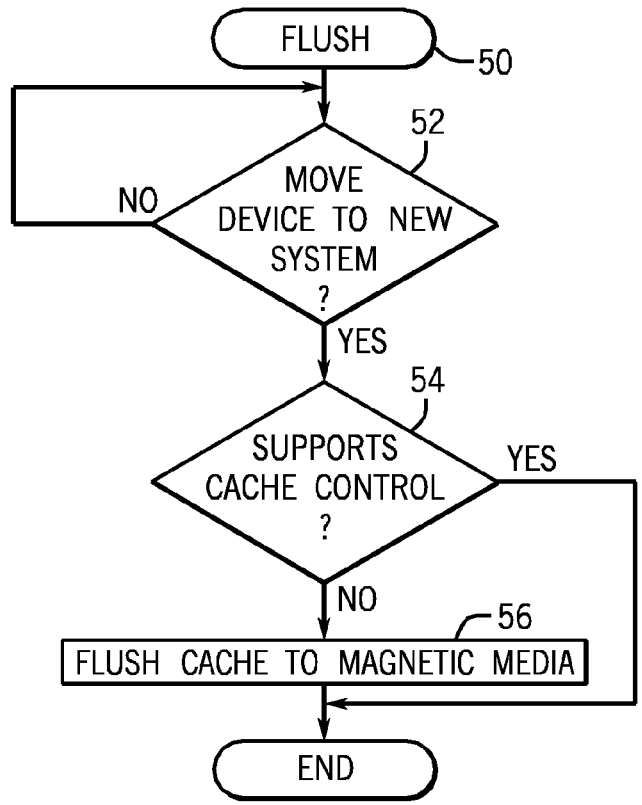
FIG. 5 is a flow chart for another embodiment of the present invention.

Referring next to FIG. 5, the flush sequence 50 may be implemented in hardware, software, and/or firmware. In software and firmware embodiments, the sequence may be implemented in computer executed instructions stored in a non-transitory computer readable medium, such as an optical, magnetic, or semiconductor storage. In one embodiment, the sequence of FIG. 5 may be part of a caching software 14 that may, for example, be stored in the system memory 18. In another embodiment, the sequence 50 may be implemented by the drive 28 itself.

A check at diamond 52 determines whether the device 28 has been moved to a new system. If the device 28 has been moved to a new system, a check at diamond 54 determines whether it supports cache control from the host of the two different types of storage. If so, the flow continues. Otherwise, the cache may be flushed to magnetic media, as determined in block 56.

Figure 6:
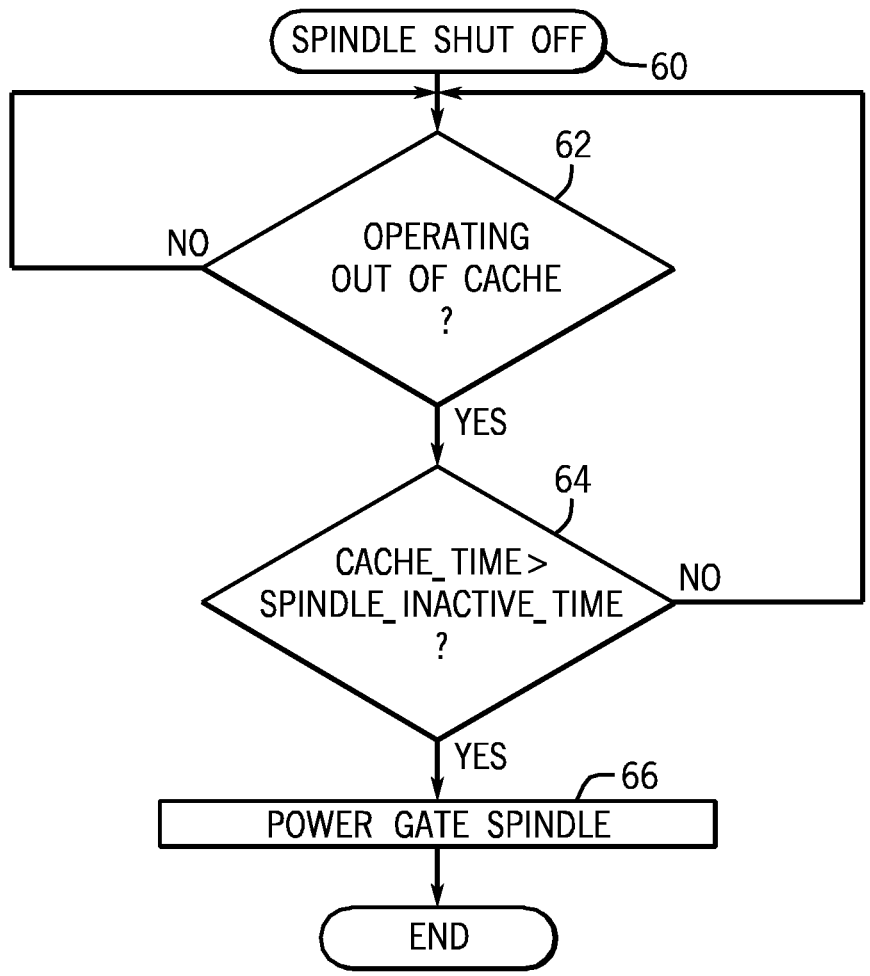
FIG. 6 is a flow chart for still another embodiment of the present invention.

Moving to FIG. 6, a spindle shutoff sequence 60 may be used to reduce power consumption, in some embodiments. The sequence may be implemented in hardware, software, and/or firmware. In software and firmware embodiments, the sequence may be implemented by computer executed instructions stored in a non-transitory computer readable medium, such as an optical, magnetic, or semiconductor storage. In one embodiment, the sequence 60 may be part of the caching software 14 stored in the system memory 18. In another embodiment, the sequence 60 may be implemented by the drive 28 itself.

A check at diamond 62 determines whether the system is operating out of the cache. If so, a check at diamond 64 determines whether the variable CacheTime, which represents the amount of time it has been operating out of the cache, is greater than a variable spindle_inactive_timer, which gives a threshold value for when the timer should be shut off. If CacheTime is greater than this threshold value, as determined in diamond 64, power to the spindle may be gated (block 66), for example using the switch 40, shown in FIG. 3.

Software pseudo code for one embodiment is as follows:

```
// host software incoming I/O handler
// support for negative LBA caching on Hybrid Device
if (hostCachingPolicy(cmd) == solidState) {
        // 2s complement LBA and issue IO so it goes to NAND
        LBA = -LBA;
        // issue IO
        issueIO(cmd, LBA);
} else if (hostCachingPolicy(cmd) == magneticMedia) {
        // issue normally to backing store
        issueIO(cmd, LBA);
}
Or
// host software incoming I/O handler
// support for managing differing media areas
if (hostCachingPolicy(cmd) == solidState) {
        // translate the logical to physical address for the device's solid
        state area
        LBA = L2P(solidStateArea);
        // issue IO
        issueIO(cmd, LBA);
} else if (hostCachingPolicy(cmd)== magneticMedia) {
        // translate the logical to physical address for the device's
        magnetic area
        LBA = L2P(magneticArea);
        // issueIO
        issueIO(cmd, LBA);
}
Flushing code:
// if the user wants to move this device to a system that does not support
// host controlled Hybrid mechanisms then the solid state area should be
// flushed to the backing store i.e. magnetic media
if (driverWillBeMoved( ) == TRUE) {
        issueIO(flushSolidStateArea, NULL);
}
Initialization code:
// If the host supports explicit control of the Hybrid mechanisms, then send
// the "Init" command to prevent automatic flushing
if (driverSupportsExplicitCacheControl( ) == TRUE) {
        issueIO(initCommand, NULL);
}
Moving data from one media type area to another
if (evictData == TRUE) {
        // evict data from solid state area to backing store (i.e. magnetic
        media)
        // moves data from negative LBA to real LBA on backing store
        issueIO(moveData, -LBA);
} else if (populateData == TRUE) {
        // populate data to solid state area from backing store (i.e.
        magnetic media)
        issueIo(moveData, LBA);
}
```

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
 using host based caching to determine caching policies in a hybrid hard disk drive;
 determining when the hybrid hard disk drive has been moved to a new system; and
 determining whether the new system has host based caching.

2. The method of claim 1 including providing a hybrid hard disk drive with two storage devices coupled by a bus.

3. The method of claim 2 wherein one of said storage devices includes rotating media and the other includes a solid state memory.

4. The method of claim 3 including, if the new system does not have host based caching, flushing data from the solid state memory to the rotating media.

5. The method of claim 3 including determining how long the solid state device has been used.

6. The method of claim 5 including determining whether the time the solid state device has been used exceeds a threshold.

7. The method of claim 6 including, if the threshold has been exceeded, reducing the speed of the rotation of the rotating memory.

8. The method of claim 7 including power gating said rotating memory if the threshold has been exceeded.

9. A non-transitory computer readable medium storing instructions to enable a computer to:
 use host based caching to determine caching policies in a hard disk drive;
 determine when the hybrid hard disk drive has been moved to a new system; and
 determine whether the new system has host based caching.

10. The medium of claim 9 further storing instructions to flush data from a solid state memory in the hybrid hard disk drive to a rotating memory in the hybrid hard disk drive if the new system does not include host based caching.

11. The medium of claim 10 further storing instructions to determine how long the solid state memory included in the hybrid hard disk drive has been used.

12. The medium of claim 11 further storing instructions to determine whether the time the solid state memory has been used exceeds a threshold.

13. The medium of claim 12 further storing instructions to reduce the speed of rotation of the rotating memory if the threshold has been exceeded.

14. The medium of claim 13 further storing instructions to power gate said rotating memory if the threshold has been exceeded.

15. A system comprising:
 a processor to implement host based caching to determine when the hard disk drive has been moved to a new system and to determine whether the new host has host based caching; and
 a hub to couple a hybrid hard disk drive.

16. The system of claim 15 including the hard disk drive coupled to said system.

17. The system of claim 16 wherein said hard disk drive includes a solid state memory and a rotating memory.

18. The system of claim 16 including two storage devices coupled by a bus.

19. A hybrid hard disk drive for connection to a host, said drive comprising:
 a bus;
 at least two storage devices coupled by said bus; and
 said drive to determine when the drive has been moved to a new host; and
 said drive to determine whether the host has host based caching.

20. The drive of claim 19 wherein one of said storage devices is a rotating memory.

21. The drive of claim 20, said drive to flush data from one storage device to the rotating memory if the new host does not have host based caching.

22. The drive of claim 21 wherein one of said storage devices is a solid state device, said drive to determine how long the solid state device has been used.

23. The drive of claim 22, said drive to flush data from the solid state device to the rotating memory if the new host does not have host based caching.

24. The drive of claim 19, one of said storage devices being a rotating memory and the other is a solid state memory, said drive to determine how long the solid state memory has been used and, if the time the solid state memory has been used exceeds a threshold, to reduce the speed of rotation of the rotating memory.

25. A method comprising:
 using host based caching to determine caching policies in a hybrid hard disk drive;
 determining how long the solid state device has been used;
 determining whether the time the solid state device has been used exceeds a threshold; and
 if the threshold has been exceeded, reducing the speed of the rotation of the rotating memory.

26. The method of claim 25 including power gating said rotating memory if the threshold has been exceeded.

27. A hybrid hard disk drive for connection to a host, said drive comprising:
 a bus;
 at least two storage devices coupled by said bus;
 said drive to determine when the drive has been moved to a new host;
 wherein one of said storage devices is a rotating memory; and
 said drive to flush data from one storage device to the rotating memory if the new host does not have host based caching.

28. The drive of claim 27 wherein one of said storage devices is a solid state device, said drive to determine how long the solid state device has been used.

29. The drive of claim 28, said drive to flush data from the solid state device to the rotating memory if the new host does not have host based caching.

* * * * *